(12) United States Patent
Senn

(10) Patent No.: US 8,777,604 B2
(45) Date of Patent: Jul. 15, 2014

(54) APPARATUS FOR MANUFACTURING PLASTIC CONTAINERS WITH VARIABLE STATION DEACTIVATION

(75) Inventor: Konrad Senn, Regensburg (DE)

(73) Assignee: Krones AG (DE)

( * ) Notice: Subject to any disclaimer, the term of this patent is extended or adjusted under 35 U.S.C. 154(b) by 433 days.

(21) Appl. No.: 13/274,117

(22) Filed: Oct. 14, 2011

(65) Prior Publication Data

US 2012/0091637 A1    Apr. 19, 2012

(30) Foreign Application Priority Data

Oct. 15, 2010   (DE) .......................... 10 2010 048 417

(51) Int. Cl.
*B29C 49/36*   (2006.01)
*B29C 49/42*   (2006.01)

(52) U.S. Cl.
USPC ........... 425/454; 364/535; 425/135; 425/136; 425/526; 425/535; 425/540

(58) Field of Classification Search
CPC ............. B29C 2949/7821; B29C 2949/78218; B29C 2949/78991; B29C 29/4205; B29C 49/36
USPC .......... 425/135, 136, 526, 534, 540; 264/454, 264/535
See application file for complete search history.

(56) References Cited

U.S. PATENT DOCUMENTS

| | | | |
|---|---|---|---|
| 7,399,435 B2 * | 7/2008 | Dunzinger et al. | ........... 264/40.1 |
| 7,649,158 B2 | 1/2010 | Doudement | ................... 219/404 |
| 7,678,304 B2 * | 3/2010 | Zoppas et al. | ............... 264/40.1 |
| 2007/0220835 A1 * | 9/2007 | Till | ................................. 53/471 |
| 2011/0033269 A1 * | 2/2011 | Bierschneider | ........... 414/222.02 |
| 2011/0260372 A1 | 10/2011 | Hahn | ............................ 264/500 |

FOREIGN PATENT DOCUMENTS

| | | | | |
|---|---|---|---|---|
| DE | 199 06 308 | | 8/2000 | ............. B29C 49/42 |
| DE | 102005060814 | * | 7/2007 | |
| DE | 10 2006 023 531 | | 11/2007 | ............. B65G 47/68 |
| DE | 10 2007 022 386 | | 11/2007 | ............. B29C 49/64 |
| DE | 10 2008 021 527 | | 11/2009 | ............. B29C 49/42 |
| EP | 1 763 429 | | 3/2007 | ............. B29C 49/78 |
| JP | 2000117825 A | * | 4/2000 | |

* cited by examiner

*Primary Examiner* — Robert B Davis
(74) *Attorney, Agent, or Firm* — Hayes Soloway P.C.

(57) ABSTRACT

Apparatus (1) for manufacturing plastic containers with a heating device (2) for heating plastic preforms (10) and a shaping device (4) for shaping plastic preforms into plastic containers, which shaping device is located downstream of the heating device (2) in a transportation direction of the plastic preforms, and with a transportation device (6), which transports the plastic preforms separately through the heating device (2) by means of a multiplicity of transport elements (14). Herein, the apparatus (1) is equipped with a stopper device (8) for temporary interruption of the flow of plastic preforms (10) to the heating device (2), wherein this stopper device (8) enables an interruption of the flow for individual plastic preforms (10). According to the invention, the heating device (2) is equipped with a multiplicity of heating elements (18) to heat individual plastic preforms (10) or groups of plastic preforms (10).

13 Claims, 1 Drawing Sheet

Figure 1:
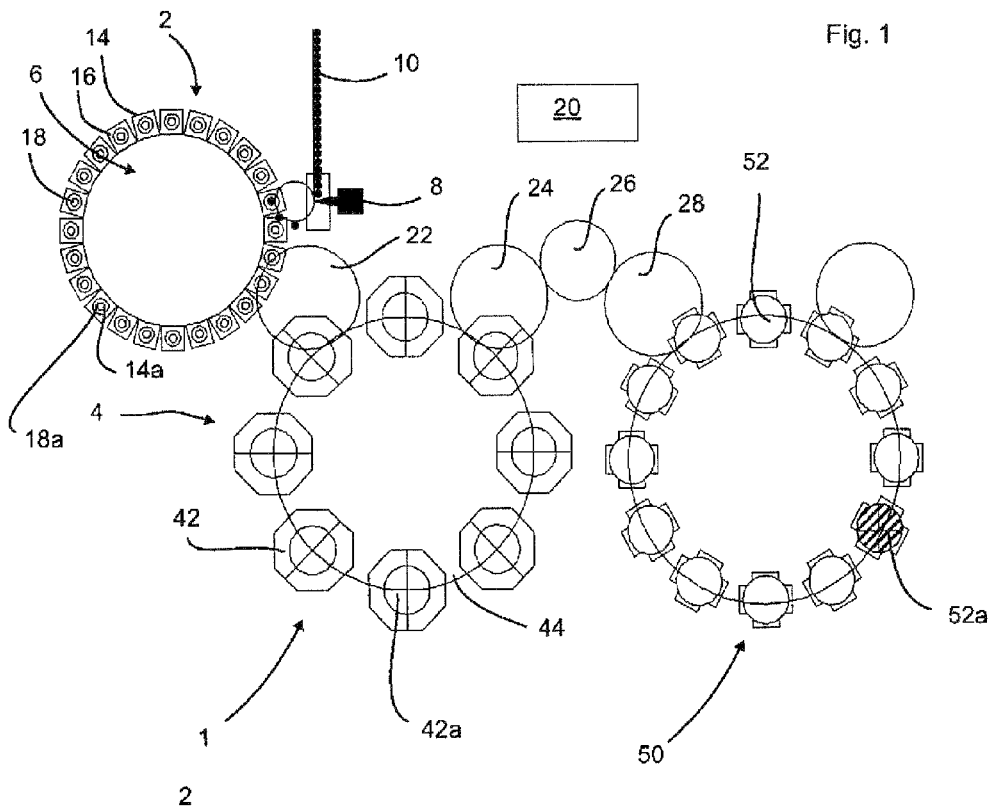

APPARATUS FOR MANUFACTURING PLASTIC CONTAINERS WITH VARIABLE STATION DEACTIVATION

The present invention relates to an apparatus for manufacturing plastic containers and, in particular, to a stretch blow-moulder. Devices of this kind have long been known from the prior art. In this connection, it is usual for plastic preforms to be heated initially in a heating device and for the plastic preforms thereby heated to be subsequently passed to a blow-moulder and there expanded into plastic containers.

In this connection, it is normal in the prior art for stretch blow-moulders of this kind to be always operated at a constant production output. The deactivation of individual stations during operation is generally not possible without having to accept a loss of plastic preforms. Furthermore, it is usual for heating devices of this kind and the downstream stretch blow-moulders to be operated in a block, in which these machines are coupled together and the individual handling stations of the machines are permanently linked to one another via transfer star wheels, and the speeds are mutually matched.

Should a handling station in one of the machines downstream of the blow-moulder, for example a labelling unit, go down, then although the stretch blow-moulder can, according to the current prior art, eject the plastic preform or container in question, the respective ejected containers are then rejects. Therefore, the object of the present invention is to create an apparatus for manufacturing plastic containers that reduces the quantity of rejects produced, even in the event of failure of downstream units. In addition, the invention is to make available a means of enabling capacity regulation at constant machine speed (e.g. when labels are being changed or during the approach/introduction of a downstream filler device for filling the containers).

This is achieved according to the invention by the subject-matter of the independent claims.

Advantageous embodiments and developments are the subject-matter of the dependent claims.

An apparatus according to the invention for manufacturing plastic containers is equipped with a heating device for heating plastic preforms and a shaping device for shaping plastic preforms into plastic containers, which shaping device is located downstream of the heating device in a transportation direction of the plastic preforms. Further provided is a transportation device, which transports the plastic preforms separately through the heating device via a multiplicity of transport elements. In this connection, the apparatus is equipped with a stopper device for temporary interruption of the flow of plastic preforms to the heating device, and this stopper device enables an interruption of the flow for individual plastic preforms.

It is preferred for the stopper device to enable by deliberate interruption the creation of predetermined gaps in the sequence of plastic preforms being transported through the heating device.

According to the invention, the heating device is equipped with a multiplicity of heating elements to heat individual plastic preforms or groups of plastic preforms. These heating elements are preferably suitable for the individual heating of individual plastic preforms or groups of plastic preforms. Whereas in the prior art all plastic preforms are normally carried past all heating elements, it is here proposed that the apparatus is equipped with a multiplicity of heating elements to which the plastic preforms are assigned during the heating process. Thus, these heating elements can accept, for example, individual plastic preforms or groups of plastic preforms, which are then heated. The individual heating of the plastic preforms by the respective heating elements is thereby enabled.

It is further proposed that, even before the plastic preforms are introduced into the heating device, they are blocked, or more precisely, are, by means of a stopper device, sent to the heating device at a later point in time, which has the effect that these plastic preforms are still available for the process at a later time, and are not rejects. The creation of individual gaps is achieved in this manner within the transportation device, and individual stations of the shaping device are correspondingly unoccupied with plastic preforms. Accordingly, it is also possible for units downstream of the blow-moulder to be unoccupied with plastic preforms of the containers at individual positions, which may be specifically selected.

The plastic preforms are advantageously transported through the heating device in a manner such as to preclude any mutual thermal influencing during the heating process. In the case of a further advantageous embodiment, at least one wall element is in each case disposed between the individual plastic preforms during their transportation through the heating device and/or during their heating. This wall element may be, for example, a component part of a heating cavity for heating the plastic preforms. This wall element also prevents, at least partially and preferably fully, any (undesirable) heat transfer between the plastic preforms. It would also be possible for a distance between the individual plastic preforms to be sufficiently large that, here again, no heat transfer can take place between two adjacent plastic preforms.

In the case of heating devices known from the prior art, the plastic preforms are normally passed sequentially through heating elements, such as infrared heating elements. If individual plastic preforms are picked out from such sequences, the respective preceding and succeeding plastic preforms will not be heated in the prescribed manner either, since the said unbroken sequence of plastic preforms is necessary for uniform heating. As mentioned, individual heating is possible owing to the provision of a multiplicity of heating elements to heat individual plastic preforms, and it is also possible in this manner to remove individual plastic preforms.

In a further advantageous embodiment, the heating elements can be individually deactivated.

The heating elements are advantageously displaceably disposed. It is possible in this case for the heating elements to be disposed, e.g. as heating cavities, on a carrier wheel and to be capable of receiving the plastic preforms. The heating elements are therefore advantageously equipped with reception chambers for receiving the plastic preforms. These reception chambers may here substantially enclose the plastic preforms around their entire perimeter, but advantageously heat at least a base element of the plastic preforms that is disposed beneath the screw thread of the plastic preforms. The heating elements preferably move, at least temporarily, along with the plastic preforms to be heated.

The apparatus is advantageously equipped with a control device to control an output rate of the apparatus. An output rate of the apparatus, i.e. the quantity of heated and shaped containers per unit of time, can thus be controlled or regulated, in particular through the use of the stopper device.

It is, for example, possible for the control device to receive a signal from a downstream handling machine (such as a labelling machine or a filling machine), indicating that the rate has to be restricted (possibly owing to a fault, a label change, a gasification of drinks containing $CO_2$, or similar).

Since the stopper device causes individual heating elements to be unoccupied, the apparatus is advantageously equipped with a compensating device downstream of the heating device or the blow device in the direction of transportation of the plastic containers, which compensating device compensates for the gaps thereby created between plastic preforms or, preferably subsequently, between the shaped plastic containers (in particular before the filler, the labelling machine or the blow wheel), and occupies the gaps with plastic containers. To this end, it would be possible to provide, e.g. after the heating device but preferably after the blow device, an air conveyor in which the plastic containers are conveyed not separately but contiguously A distributor star wheel could also be connected downstream of the heating device, or preferably of the blow device, likewise effecting a compensation of any gaps created. A distributor star wheel of this kind has been described in, for example, DE 10 2006 023 531. The contents of this document herewith become fully incorporated by reference into the subject-matter of the present application.

The control device preferably controls the output rate of the apparatus as a function of a signal from a unit located upstream or downstream in the direction of transportation of the plastic preforms. This unit is advantageously selected from a group of units comprising stretch blow-moulders, labelling machines, filler devices for the containers, sterilisation devices for the containers, or similar. This signal may here originate from the blow device itself and may derive from e.g. a running-up or damping-down of this blow device.

In the case of a further advantageous embodiment, the apparatus is equipped with a multiplicity of stretching rods to elongate the plastic preforms in their longitudinal direction. These stretching rods are here preferably equipped with electrical drives, and are especially advantageously controllable independently of one another. Under the prior art, stationary stretching curves are normally used, effecting a uniform movement of all stretching rods. Owing to the electrical drive devices proposed here (e.g. in the form of servo or linear motors), the movements of the individual stretching rods can be individually controlled. In this manner, a stretching speed dependent on the machine speed can also be achieved.

In the case of a further advantageous embodiment, the heating device is of a type for individual heating of the preforms, special preference being given to a microwave, laser or STIR heating system. The microwave-based heating device is here preferably equipped with a microwave-generation unit, such as a magnetron, and also especially preferred is a waveguide, which passes the generated microwaves on to a resonator.

The resonator may here also constitute the said reception chamber for the plastic preforms.

In the case of a further advantageous embodiment, the shaping device is equipped with a multiplicity of blow stations for shaping the plastic preforms, and an assignment device is provided, which unequivocally assigns a blow station to each of the transportation elements of the heating device. Thus it is possible, for example, should a fault be detected in individual blow stations, for those plastic preforms transported with a transportation element assigned to this blow station to be arrested by a stopper as a result of this fault, in order to be sent ultimately to the next heating cavity. It would, however, also be possible for the said assignment to take place in a reverse manner, i.e. if for example, a fault in a particular heating element in the heating device is detected, the relevant plastic preform is discharged here after the heating process, and therefore no blowing process will take place for this plastic preform.

It would also be possible for every n-th of m blow stations to be assigned to a particular heating element during the operating sequence, where n is the number of heating elements, or for every n-th of m heating elements to be assigned to a particular blow station where n is the number of blow stations. In any event, it is preferable that through the assignment device it can be established, for each blow station, which heating element is transporting the plastic preform that will enter this particular blow station.

In the case of a further advantageous embodiment, the apparatus is equipped with a filler device for filling the containers, wherein the filler device is located downstream of the shaping device in the transportation direction of the plastic containers. This means that the plastic containers manufactured with the aid of the shaping device are subsequently filled by means of a filler device.

The present invention also relates to a heating device for heating plastic preforms, in particular for an apparatus of the above-described type, wherein this heating device is equipped with a transportation device, which transports the plastic preforms separately through the heating device by means of a multiplicity of transportation elements. The apparatus is equipped with a stopper device for the temporary interruption of the flow of plastic preforms to the heating device, and this stopper device enables an interruption of the flow for individual or for a plurality of plastic preforms.

According to the invention, the heating device is equipped with a multiplicity of heating elements for heating individual plastic preforms, wherein the plastic preforms are assignable to these heating elements at least temporarily during the heating process.

It is therefore proposed in respect of the heating device also that even before the actual heating process, individual plastic preforms or groups of a few plastic preforms. for example comprising two or three plastic preforms, should be held back for a certain period until the next microwave station (in general terms, the next heating element) is to be occupied.

The present invention further relates to a method of heating plastic preforms, wherein the plastic preforms are transported along a predetermined transport path through a heating device by means of a multiplicity of transportation elements of a transportation device. In this connection, the plastic preforms are heated at least temporarily during this transportation. An interruption in the flow into the heating device is enabled by a stopper device for individual plastic preforms.

According to the invention, the plastic preforms are heated individually by a multiplicity of heating elements, wherein the plastic preforms are assigned to these heating elements.

Thus, in respect of the method also, it is proposed that the flow of plastic preforms can be deliberately interrupted for individual plastic preforms, e.g. in order to react to faults in downstream units. Owing to the individual heating of the plastic preforms, the opportunity of creating gaps between the plastic preforms is additionally enabled.

The interruption in flow for individual plastic preforms therefore preferably takes place as a function of a fault status in a unit disposed downstream of the heating device in a transportation direction of the plastic preforms. This unit may be, for example, a blow device, a filler device, a closing device, a labelling device, a sterilisation device for the plastic containers, or similar.

The plastic preforms are advantageously delivered to the heating elements separately and heated individually by these heating elements.

The interruption of flow for individual plastic preforms (10) preferably takes place as a function of the required production output of the apparatus (1).

Further advantages and embodiments are described with reference to the accompanying drawings.

These show:

FIG. 1 An apparatus for manufacturing plastic containers; and

Figure 2:
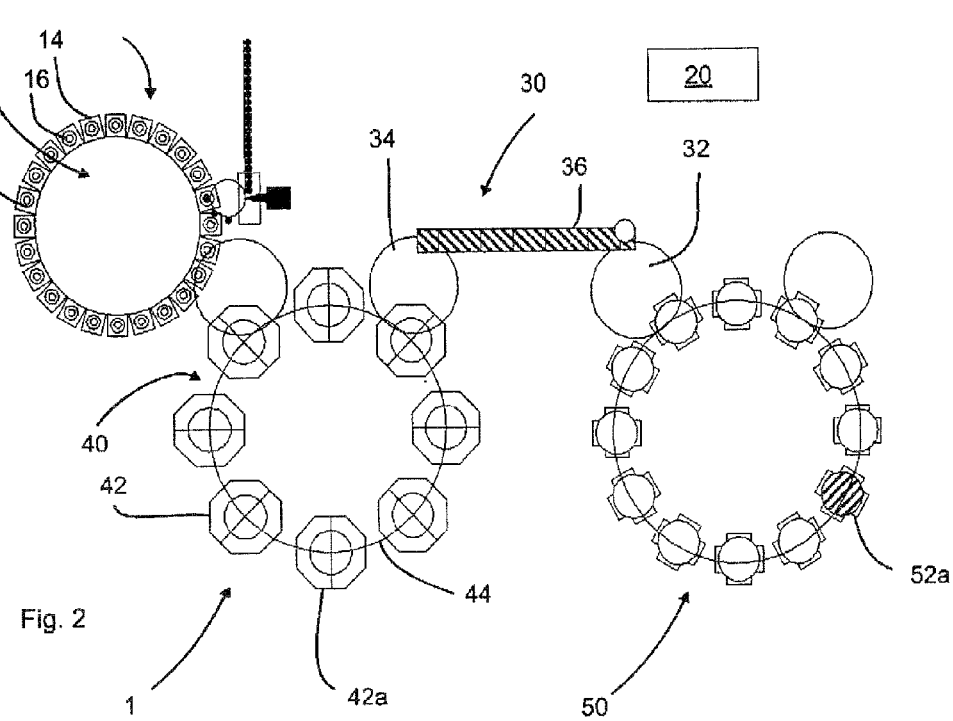

FIG. 2 A further view of the apparatus from FIG. 1.

FIG. 1 shows an apparatus for manufacturing plastic containers, designated in its entirety with 1. Here, plastic preforms 10, proceeding from e.g. a reservoir (not shown), are carried via a single-cycle wheel 11 of a heating device 2, designated in its entirety with 2, in order to heat the plastic preforms 10.

The heating device 2 is equipped with a multiplicity of heating elements 18, which each serve for the individual heating of the plastic preforms 10, and which are disposed on a rotatable carrier 6, such as a heater wheel. The heating elements 18 here respectively also constitute component parts of transportation elements 14, which transport the plastic preforms while they are heated. Reference numeral 16 relates to a wall element, which is disposed between the individual plastic containers 10 during transportation of the plastic containers 10. This wall element is here a component part of the heating element 18, but it is also conceivable for the plastic preforms not to be carried in the respective heating cavities through the heating device 2, but for wall elements to be disposed respectively between the individual plastic preforms during transportation of the plastic preforms 10 through the heating device.

Reference numeral 8 refers to a stopper device, which induces the stopping of the flow of plastic preforms 10 for particular individual plastic preforms 10.

Starting from the heating device 2, the plastic containers 10 are passed to a blow device 4 via a transportation device such as a transportation star wheel 22. The blow device 4 is in turn equipped with a multiplicity of blow stations 42, which are likewise transported by means of a rotatable carrier 44, i.e. a blow wheel. From the blow device 4, the containers are passed on to a filler device 50 via a plurality of transportation star wheels 24, 26, 28. During this transportation, further handling steps, such as sterilisation, may also be undertaken on the now ready-blown containers. Alternatively, the sterilisation, or a further sterilisation, may also have taken place between the heating device 2 and the blow device 4. The advantage here is that the container is still present in the form of a plastic preform.

The filler device 50 is also equipped with a multiplicity of filler stations 52. If, for example, an error function should occur on a filler station 52a, a control device 20 can determine which blow station 42a is expanding the plastic preform that will ultimately arrive at the filler station 52a. Furthermore, the transportation element 14a or the heating element 18a which is transporting or heating the particular plastic preform that will ultimately arrive at the filler station 52a can also be determined.

If, for example, one of the 12 filler stations 52a shown in FIG. 1 is defective, the instruction can be given to the stopper device 8 to eject every $12^{th}$ plastic preform, these being in each case the particular plastic preforms that will arrive as containers at filler station 52a. Should the quantity of filler devices 52, blow stations 42 and heating elements 14 differ, then particular heating elements will not be left unoccupied as a result.

Owing to the temporary stoppage of the flow of plastic preforms to the heating device before they are heated, they can still remain available for a subsequent heating process. In addition, the particular blow stations concerned, i.e. then unoccupied, can be deactivated to avoid a wasted blowing-air operation.

It would also be possible for faults not to occur until after the filler device 50, and accordingly for determination to be made by the control device 20 as to which particular preceding blow stations and heating elements ought to be deactivated and which plastic preforms are to be held back by the stopper device. Gaps are therefore created by the stopper device as early as the single-cycle star wheel 11. So, throughout the entire handling of the plastic preforms and containers, they are conveyed separately.

If the stopper device 8 is briefly closed and subsequently immediately re-opened, this has the effect that precisely one or a plurality of heating elements will not receive any plastic preform 10. In addition, a heating-station deactivation can be coordinated and integrated into the system control in a manner such that all downstream handling stations can react thereto. This is possible by using, for example, a shift register or a shift-register entry. Conversely, the preform flow can be deliberately interrupted using the control 20 in a manner such that a particular downstream handling station 42, 52 does not have to handle any further containers.

Moreover, it would also be conceivable for the production capacity to be varied via the station deactivation with a variable intermediate star wheel, which operates in particular as a buffer, so that the production capacity can be restricted with unchanging speed and thereby with unchanging bottle quality. This may be necessary, for example, when running-up the filler device or when bonding a label.

FIG. 2 shows a further embodiment of an apparatus according to the invention. With this embodiment, the blow device 40a is followed by a compensation device 30, which closes up gaps created in the stream of manufactured containers. Specifically, a delivery wheel 34 is provided, which passes the plastic preforms on to an air conveyor device 36. In this air conveyor device 36, the plastic preforms are conveyed sequentially, i.e. not separately, as a result of which any gaps created close up again. The now unbroken sequence is carried to the filler device 50 via a supply wheel 32. It would, however, also be possible to provide a compensation device of this kind, e.g. in the form of a distributor star wheel, between the heating device 2 and the blow device 40.

The applicant reserves the right to claim all the features disclosed in the application documents as essential for the invention to the extent that they are novel individually or in combination relative to the prior art.

List of Reference Numerals

1 Apparatus
2 Heating device
4 Blow device
6 Carrier, heater wheel
8 Stopper device
10 Plastic preform
11 Single-cycle wheel
14, 14a Transportation element
16 Wall element
18, 18a Heating element
20 Control device
22 Transportation star wheel
24, 26, 28 Transfer star wheel
30 Compensation device
32 Supply wheel
34 Delivery wheel
36 Air conveyor device
40 Blow device
42, 42a Blow station
44 Carrier 50 Filler device
52, 52a Filler station

The invention claimed is:

1. An apparatus for manufacturing plastic containers with a heating device for heating plastic preforms and a shaping device for shaping plastic preforms into plastic containers, which shaping device is located downstream of the heating device in a transportation direction of the plastic preforms, and with a transportation device, which transports the plastic preforms separately through the heating device using a multiplicity of transport elements, wherein the apparatus is equipped with a stopper device for temporary interruption of the flow of plastic preforms to the heating device, and this stopper device enables an interruption of the flow for individual plastic preforms,
wherein
the heating device is equipped with a multiplicity of heating elements to heat individual plastic preforms or groups of plastic preforms.

2. The apparatus according to claim 1, wherein the heating device is equipped with a multiplicity of wall elements, which are disposed between the individual plastic preforms during the heating of the plastic preforms.

3. The apparatus according to claim 2, wherein the heating elements are displaceably disposed.

4. The apparatus according to claim 2, wherein the heating elements are equipped with reception chambers for receiving the plastic preforms.

5. The apparatus according to claim 1, wherein the apparatus is equipped with a control device to control an output rate of the apparatus.

6. The apparatus according to claim 5, wherein the control device controls the output rate of the apparatus as a function of a signal from a unit located in the direction of transportation of the plastic preforms.

7. The apparatus according to claim 1, wherein the heating device is a microwave-based heating device.

8. The apparatus according to claim 1, wherein the shaping device is equipped with a multiplicity of blow stations for shaping the plastic preforms, and an assignment device is provided, which unequivocally assigns a blow station to each of the transportation elements.

9. The apparatus according to claim 1, wherein the apparatus is equipped with a filler device for filling the containers, wherein the filler device is located downstream of the shaping device in the transportation direction of the plastic containers.

10. The apparatus according to claim 1, wherein the heating device is equipped with a multiplicity of heating elements for heating individual plastic preforms, wherein the plastic preforms are assignable to these heating elements at least temporarily during the heating process.

11. A method for manufacturing plastic containers using the apparatus according to claim 1, wherein plastic preforms are transported along a predetermined transport path through a heating device using a multiplicity of transportation elements and the plastic preforms are heated at least temporarily during this transportation, wherein an interruption in the flow into the heating device is enabled by the stopper device for individual plastic preforms, wherein the plastic preforms are heated individually by a multiplicity of heating elements, wherein the plastic preforms are assigned to these heating elements.

12. The method according to claim 11, wherein the interruption in flow for individual plastic preforms takes place as a function of a fault status in a unit disposed downstream of the heating device in a transportation direction of the plastic preforms.

13. The method according to claim 11, wherein the interruption of flow for individual plastic preforms takes place as a function of the required production output of the apparatus.

* * * * *